United States Patent [19]

Huhn et al.

[11] 4,267,094

[45] May 12, 1981

[54] AQUEOUS POLYMER MIXTURE, PROCESS FOR ITS PREPARATION AND ITS USE AS SUBSTRATE ANCHORING, BLOCKING RESISTANT ONE-COAT SEALING LACQUER ON SHEET PRODUCTS

[75] Inventors: Helmut Huhn, Walsrode; Werner Karstens, Fallingbostel, both of Fed. Rep. of Germany

[73] Assignee: Bayer Aktiengesellschaft, Fed. Rep. of Germany

[21] Appl. No.: 121,367

[22] Filed: Feb. 14, 1980

[30] Foreign Application Priority Data

Feb. 17, 1979 [DE] Fed. Rep. of Germany ....... 2906118

[51] Int. Cl.³ .............................................. C08L 27/08
[52] U.S. Cl. .............................. 260/29.6 RW; 525/902
[58] Field of Search .............. 260/29.6 RB, 29.6 RW, 260/29.6 WB; 525/902

[56] References Cited

U.S. PATENT DOCUMENTS

| | | | |
|---|---|---|---|
| 3,309,330 | 3/1967 | Settlage | 260/29.6 RW |
| 3,401,134 | 9/1968 | Fantl | 260/29.6 RW |
| 3,458,603 | 7/1969 | Griffin | 525/252 |
| 3,562,235 | 2/1971 | Ryan | 260/29.6 RB |
| 3,745,196 | 7/1973 | Lane | 260/29.6 RB |
| 4,086,296 | 4/1978 | Carty | 260/23 AR |
| 4,107,120 | 8/1978 | Plamondon | 260/29.6 RB |
| 4,156,669 | 5/1979 | Lee | 260/29.6 RB |

*Primary Examiner*—Paul R. Michl
*Attorney, Agent, or Firm*—Connolly and Hutz

[57] ABSTRACT

Aqueous polymer mixture, process for its preparation and its use as substrate anchoring, blocking resistant one-coat sealing lacquer on sheet products.

An aqueous polymer mixture containing at least two polymeric components A and B, A being present in form of an aqueous dispersion and consisting of micronuclear shell structures comprising as nuclear portion a copolymer of methyl acrylate, ethyl acrylate, acrylic acid, methacrylic acid -n-butyl ester and/or methyl methacrylate and vinylidene halide and as shell portion a copolymer of methyl acrylate, ethyl acrylate, ethyl methacrylate ethyl hexyl acrylate, n-butyl (meth-)acrylate and/or itacaconic acid and vinylidene halide; and B being present in form of an aqueous alkaline solution and consists of a (co)polymer of unsaturated carboxylic acid amide -N-methylol derivatives and optionally unsaturated carboxylic acids and/or amides of said acids.

14 Claims, No Drawings

AQUEOUS POLYMER MIXTURE, PROCESS FOR ITS PREPARATION AND ITS USE AS SUBSTRATE ANCHORING, BLOCKING RESISTANT ONE-COAT SEALING LACQUER ON SHEET PRODUCTS

This invention relates to an aqueous polymer mixture of at least two components containing a vinylidene halide copolymer (VDC) for the preparation of substrate anchoring, heat-sealing one-layer coatings with good blocking resistance and sliding properties on supports in the form of sheet products.

Substrate-anchoring, heat-sealing one-layer coatings are already known in the literature.

A self-anchoring, one-coat substance of VDC copolymer obtained by the polymerisation of a monomer mixture containing acrylate compounds and itaconic acid in addition to VDC has been disclosed in U.S. Pat. No. 2,570,478. This lacquer is said to adhere particularly firmly to a support of regenerated cellulose and form a suitable packaging film with this material.

Another self-anchoring, one-coat lacquer on foils of regenerated cellulose hydrates has been disclosed in German Offenlegungsschrift No. 1,519,216, corresponding to Canadian Pat. No. 827,724. This lacquer contains phenoplasts and/or aminoplasts condensed from phenol and/or amine in a mixture of water and diglycol. A similar lacquer substance prepared from aqueous vinylidene chloride copolymer dispersions has been disclosed in German Offenlegungsschrift No. 1,519,217. In this document, corresponding to British Pat. No. 1,166,297, an improvement of the German Offenlegungsschrift No. 1,519,216 is taught since the time required for the self-anchoring layer to reach maximum bond strength is reduced by the addition of an alkaline solution of a substituted ortho-hydroxybenzophenone and/or orthohydroxychalcone as a bonding accelerator. Since, according to German Offenlegungsschrift No. 1,669,204, these substances dissolve only slowly and with difficulty, the last mentioned Offenlegungsschrift proposes readily soluble bonding accelerators such as maleic imide, biuret, hydantoin, ε-caprolactam, acet-hydrazidepyridinium chloride, N-methyl-N-nitrosourethane and condensation products of cyanuric chloride with organic amines. These accelerators, however, must always be dissolved in an aqueous mixture of alkali and ammonia.

Other prior publications deal with improvements to the blocking of the seals which also occurs in self-anchoring one-coat lacquers applied to substrates. Thus, Austrian Pat. No. 291,605 discloses such an improvement obtained by the addition of a certain wax (Hoechstwachs OP ®) to the one-coat lacquer.

Another group of aqueous dispersions of coating compounds in the form of self-anchoring one-layer coatings which has been known for some time includes finely dispersed microspheres which have been built up on the shell structure principle, and hang together to solidify in the lacquer subsequently produced. Substances of this type have been described inter alia in U.S. Pat. No. 3,309,330; German Pat. No. 2,034,257 corresponding to U.S. Pat. No. 3,745,136 and German Offenlegungsschrift No. 2,725,586.

In the interests of making one and the same aqueous dispersion of coating compound suitable for a very wide range of applications, it is desirable that such a substance should have as many advantageous properties as possible.

The problem therefore arises of providing as aqueous polymer mixture containing a vinylidene halide copolymer for the preparation of heat-sealing one-layer coatings which are self-anchoring to their substrate and have good blocking resistance and sliding properties on sheet products and which as far as possible combine all of the following desirable properties for a wide range of applications:

1. Good anchoring of the lacquer to the substrate even in the event of prolonged exposure to boiling temperatures;
2. good transparency even in the event of prolonged exposure to boiling temperatures (if possible no "white discoloration");
3. ease of separation, e.g. from firmly adhering goods which are wrapped in the sheet product;
4. good anti-blocking and sliding properties;
5. low permeability to water, water vapour and oxygen;
6. good sealing properties to itself and to other substances;
7. very low minimum film-forming temperatures;
8. high stability in storage and age resistance of the polymer dispersions;
9. formation of surfaces which can easily be printed;
10. formation of surfaces which can easily be treated by vapour deposition, e.g. for the application of metals by vacuum vapour deposition;
11. great flexibility combined with good folding strength of the coatings;
12. physiological acceptability, particularly of the anchoring component in the coating;
13. very low residual monomer content of the coating;
14. very low adherence of the coating to the sealing jaws;
15. substantial freedom of the coating from organic solvents.

This object is achieved by the present invention which provides an aqueous polymer mixture of at least two components containing a vinylidene halide copolymer for the production of heat sealing one-layer coatings which are self-anchoring on sheet products and have good blocking resistance and sliding properties. The inventive, aqueous polymer mixture which is stable in a weakly acidic to neutral medium is composed of:

I a first component A which contains the vinylidene halide copolymer and is preferably present in the form of an acidic aqueous dispersion and consists of micronuclear shell structures comprising a copolymer which forms the nuclear portion, which copolymer is derived from a monomer mixture (1) of 10 to 57% by weight, based on the total mixture of methyl acrylate and/or 5 to 30% by weight based on the total mixture, of ethyl acrylate and/or 1 to 5% by weight, based on the total mixture, of acrylic acid and/or 15 to 30% by weight, based on the total mixture, of methacrylic acid-n-butyl ester and/or 15 to 30% by weight, based on the total mixture, of methyl methacrylate and the quantity of vinylidene halide required to make up the percentage by weight to 100, and a copolymer forming the shell portion, which is derived from a monomer mixture (2) of 1 to 14% by weight, based on the total mixture (2), of methyl acrylate and/or 1 to 14% by weight, based on the total mixture (2), of methyl methacrylate and/or 1 to 14% by weight, based on the total mixture (2), of ethyl acrylate and/or 1 to 14% by weight, based on the total mixture (2), of ethyl methacrylate and/or 1 to 14% by weight, based on the total mixtures, of ethyl hexyl acrylate and/or 1 to 14% by weight based on the total mixture (2), of n-butyl acrylate and/or 1 to 14% by weight, based on the total mixture (2), of n-butyl methacrylate and 0.1 to 5% by weight, based on the total mixture (2), of itaconic acid and the amount of vinylidene halide required to make up this monomer mixture to 100% by weight, but not amounting to more than 95% by weight, based on 100% of the total monomer mixture (2), II and of a component B which is a polymeric anchoring component containing functional groups and which is in the form of an aqueous alkaline solution and consists of homo- and/or copolymers in the form of recurrent structural units of unsaturated carboxylic acid amide-N-methylol derivatives corresponding to the general formula

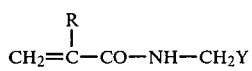

in which
R represents —H or —CH$_3$ and
Y represents

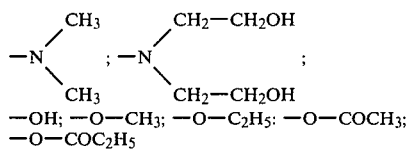
—OH; —O—CH$_3$; —O—C$_2$H$_5$: —O—COCH$_3$;
—O—COC$_2$H$_5$ and which component B may optionally contain unsaturated water-soluble carboxylic acids and/or the amide of these unsaturated carboxylic acids and/or methacrylic acid amide, and optionally also of further components C in the form of known plasticizers and/or components D in the form of known lubricants and/or components E in the form of known pigments.

The inventive aqueous coating mixtures yield excellent coating lacquers especially because of the unexpected good compatibility of aqueous dispersion with the aqueous solution, so that the end product shows hitherto unknown advantageous properties in accordance with the list given above.

It is also advantageous if the vinylidene halide present as recurrent structural unit in component A and contained as a monomer in the mixture of starting monomers is vinylidene chloride. Furthermore, it is advantageous if the carboxylic acid amide-N-methylol derivative present as recurrent structural unit in component B of the aqueous polymer mixture and corresponding to a monomer in the mixture of starting monomers is methacrylic acid amido-N-methylolmethyl ether.

Particularly advantageous results are obtained if in addition to methacrylic acid amino-N-methylolmethyl ether, component B contains acrylic acid amide as recurrent structural unit corresponding to the mixture of starting monomers, either alone or together with acrylic acid as unsaturated carboxylic acid in the form of the monomer structural units. In this component B, acrylic acid amide may be replaced as recurrent structural unit by the recurrent structural unit, N-methylolacrylamide.

The above-mentioned components of recurrent structural units may be used in wide ranges of quantities within the process of this invention although it is advantageous if the recurrent structural units in component B of the muli-component polymer mixture according to the invention are present within ranges of quantities suitably adjusted to each other so that methacrylic acid amido-N-methylolmethyl ether is present in a quantity of 20 to 80% by weight of the copolymer, acrylic acid amide in a quantity of 20 to 80% by weight of the copolymer, the recurrent structural unit N-methylolacrylamide, which is occasionally used as replacement for acrylic acid amide, in a quantity of 20 to 30% by weight of the copolymer and acrylic acid, which is occasionally used as recurrent structural unit in addition to methacrylic acid amido-N-methylolether and acrylic acid amide, in a quantity of 3 to 8% by weight of the copolymer.

The product according to the invention can be particularly advantageously prepared by using a known method of polymerisation such as follows:

First, to produce component A, a nuclear dispersion (substance I) is first prepared by a known technique of aqueous emulsion polymerisation, by copolymerising 10 to 57% by weight of methyl acrylate and/or 5 to 30% by weight of ethyl acrylate and/or 1 to 5% by weight of acrylic acid and/or 15 to 30% by weight of n-butyl methacrylate and/or 15 to 30% by weight of methyl methacrylate and the quantity of vinylidene halide required to make up the percentage by weight to 100, using sodium vinyl sulphonate and a conventional emulsifier in the presence of a known redox catalyst. An aqueous dispersion of shell structure substance synthesised from three further, separately prepared substances (II, III and IV) is then polymerised on to the resulting aqueous dispersion of nuclear polymer substance (substance I) by the following method: Substance (II) in the form of a monomer mixture of vinylidene halide, butyl acrylate and ethyl hexyl acrylate and, separately therefrom, substance (III) in the form of a mixture of a commercial emulsifier and the reduction component of a conventional redox catalyst and, separately therefrom, substance (IV) in the form of the oxidation component of a conventional redox catalyst taken up in water, are added to the already polymerised, dispersed nuclear substance (I) to which an aqueous solution of itaconic acid and an aqueous solution of conventional redox catalyst have previously been added. The shell structure polymer is then polymerised on this nuclear substance by the usual technique of emulsion polymerisation to form the aqueous dispersion of component A. The water-soluble component B which has been separately prepared by (co) polymerisation from an unsaturated carboxylic acid amide-N-methylol derivative of the general formula

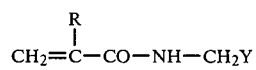

in which
R represents —H or —CH$_3$
and Y represents

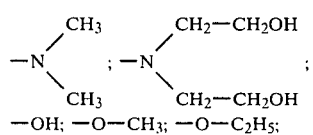
—OH; —O—CH$_3$; —O—C$_2$H$_5$;

-continued

—O—CO—CH$_3$; —O—CO—C$_2$H$_5$ and optionally also from an unsaturated water-soluble carboxylic acid and/or the amide of this carboxylic acid and/or methacrylic acid by the usual techniques with the addition of a redox initiator is then added to component A to form the finished aqueous polymer mixture, optionally with the addition of further components in the form of known plasticizers C and/or lubricants B and/or pigments E.

When carrying out the process according to the invention, it is very convenient to use the same emulsifier and the same redox catalyst for preparing the nuclear substance and for the further treatment of the nuclear substance before formation of the shell substance is begun and for preparation of the shell structure substance itself. The preferred emulsifier is an n-alkyl sulphate, most preferably n-lauryl sulphate. An advantageous redox catalyst consists of an aqueous solution of hydrogen peroxide as oxidation component and an aqueous solution of isoascorbic acid as reduction component. Only for forming component B it is advantageous to use a redox initiator in the form of an aqueous solution of ammonium persulphate and sodium pyrosulphite. Component A of the polymer mixture is advantageously prepared in an aqueous acidic medium and is stable when stored in such a medium while component B of the polymer mixture according to the invention is preferably prepared in an aqoueous alkaline medium and is also optimally stable in such a medium. The best stability in storage for components A and B after they have been added together is obtained in a weakly acidic to neutral medium. The most suitable pH ranges for the component A itself is 1 to 3, for the component B itself is 8 to 10 and for polymer mixture A+B according to the invention it is 5.5 to 7. It is particularly surprising that the stability of the polymer mixture is obtained in a range in which the individual components of this polymer, namely A alone or B alone, are not stable. Another advantage is that the pH range of 5.5 to 7 which has a stabilizing effect on the polymer mixture is only in the rarest of cases corrosive to other media.

This advantageous pH range can be maintained in the event of the addition of further components in the form of known plasticizers (C) and/or lubricants (D) and/or pigments (E).

The inventive polymer mixtures contain from 97 to 99.9% by weight of component A itself, preferably 98.5 to 99.5% by weight and 0.1 to 3% by weight, preferably 0.5 to 1.5% by weight of component B itself, whereby the % by weight also amount to 100.

The polymer mixture according to the invention can be used for a wide variety of purposes by virtue of their numeral advantageous properties described above. The substrate-anchoring, heat-sealing one-layer lacquer coatings prepared from the polymer mixtures according to the invention adhere firmly to sheet products of all kinds and have good blocking resistance and sliding properties. Although the coating according to the invention is preferably applied to sheet products made of cellulosic substances, it adheres equally well to synthetic resins, starch compounds, sheets containing collagen, and even to metal surfaces.

Preferably the polymer mixture according to the invention are used as a coating on foils such as cellulosic substrate preferably regenerated cellulose, with or without fibre reinforcement, or cellulose ether such as methyl cellulose, hydroxyethyl cellulose, hydroxypropylmethyl cellulose or carboxymethyl cellulose. The foils may be either flat sheets or tubes. Regeneration celluloses reinforced with cellulose fibres are particularly intended for use in the form of tubular casings covered on the inside with a firmly bonded coating obtained by application and drying of the polymer mixture according to the invention.

The polymer mixture according to the invention may, however, also be applied to various synthetic materials which are preferably in the form of sheets. These materials are preferably polyolefines such as polyethylene, polypropylene and poly(iso)butylene; polyesters such as polyethylene terephthalate and polybutyleneterephthalate; polycarbonates, polystyrene, polyvinyl halides such as polyvinylchloride; polyvinyl alcohols, polyamides such as 6-, 6-6, 6-11, 11 and 12-polyamides. All of these materials may either be in the form of their homopolymers or in the form of their copolymers, alone or in admixture with other synthetic materials. The coatings obtained by application of the polymer mixture according to the invention to sheet products of the type mentioned above are also useful where these sheets are required to be pigmented, printed or coated with metal by vapour deposition.

The various advantageous properties of the coating also make it possible for these foils coated with the polymer mixtures according to the invention to be used as various types of wrapping units including, for example, bags with sealed edges, flat bags, various types of block bottom bags, single and multicompartment bags, tear-open bags, tear-off bags, vacuum bags, sterilizing bags, carrier bags and stand bags. Foils carrying coatings which have been formed from the polymer mixture according to the invention may be also used as foils for covering dikes, protecting buildings and glass, protecting furniture and motor car seats, lining the interior of containers, wrapping flowers and protecting maps, and as lids for cups and dishes, as blister packages and as cigarette wrappings, depending on the thickness, flexibility and other properties of the various foil substances uses as substrates. With a suitable choice of the concentration of bonding agent as a recurrent monomeric structural unit (and in the case of substrates coated on both sides), and with suitable choice of the material of the supporting foil, such sheet products may also be used as laminates for safety glass.

If the supporting foils are capable of being stretched, the aqueous coating mixture according to the invention may be applied to the supporting foil either before or after stretching of the foil or between two stretching stages. All known types of stretching are envisaged, such as longitudinal stretching, transverse stretching, successive longitudinal and transverse stretching and simultaneous longitudinal and transverse stretching.

Owing to the extremely low minimum film-forming temperature the application of the aqueous polymer mixture according to the invention to a supporting foil may be followed by stretching with or without the aid of fixing by heat or with or without simply heating. In any of these cases, formation of the film is ensured and unaffected by the stretching temperature. All the components made above apply equally to flat foils and tubular foils, provided stretching techniques allow this.

When the invention is carried out in combination with a printing process, the supporting foil which is to be covered with the polymer mixture according to the invention may, for example, already have been printed on one or both sides, and if the foil is then coated on the printed side, an excellent counterprint image is obtained. Equally well, the surface of the foil may first be coated with the compound according to the invention and subsequently printed in one or more colours.

Self-supporting films can readily be obtained from the aqueous coating compound according to the inventon, for example by applying the aqueous compound according to the invention to an endlessly revolving band of hydrophobic and substance-repellent supporting material on which it is distributed as a coating and consolidated. Due to the excellent ability of the aqueous polymer mixture according to the invention to be shaped and adapt itself to any form, the mixture can be applied to an endless band of the type described above covered with a surface relief so that the self-supporting foil thereby obtained carries the negative of this relief. This method is employed at the present time to produce weave patterns and longitudinal or transverse grooves.

EXAMPLE 1

The following description given by way of example is subdivided into the preparation of component A and the preparation of component B, which two components are mixed together after they have been prepared separately, the finished mixture constituting the aqueous coating compound according to the invention. Component A alone is prepared on the shell structure principle, i.e. a nuclear dispersion is first prepared and a shell is then formed around the nuclei. A suitable method is described in detail below.

PREPARATION OF COMPONENT A (a) Preparation of the nuclear dispersion 150 kg of water, 18 kg of a 10% by weight n-lauryl sulphate, 1.8 kg of a 25% by weight sodium vinyl sulphonate, 3.6 kg of vinylidene chloride and 2.4 kg of methyl acrylate were mixed together in an autoclave equipped with stirrer, and the autoclave was sealed and then heated to 30° C. When this temperature had been reached, 0.2 kg of a 35% by weight $H_2O_2$ and 0.03 kg of isoascorbic acid (in each case dissolved in 1 kg of water) were forced into the autoclave contents as redox catalyst through a pressure valve. The following were then similarly introduced continuously and simultaneously within 120 minutes:

(1.) a monomer mixture of 26.4 kg vinylidene chloride and 17.6 kg methyl acrylate;

(2.) 0.3 kg of a 35% by weight $H_2O_2$ dissolved in 30 kg of water;

(3.) 0.1 kg of isoascorbic acid dissolved in 30 kg of water.

The autoclave contents were left at 30° C. for a further 240 minutes after all the components had been introduced, and the contents were then cooled to room temperature.

The yield obtained was 282 kg of an 18.6% by weight nuclear dispersion.

(b) Method of shell structure polymerisation 16.8 kg of the 18.6% by weight nuclear dispersion obtained were introduced into an autoclave with stirrer together with 120 kg of water in which 2.1 kg of itaconic acid were dissolved, and the autoclave contents were heated to 30° C. under a nitrogen atmosphere. When this temperature had been reached, 60 g of a 35% solution of $H_2O_2$ and 18 g of isoascorbic acid, each dissolved in 500 ml of water, were forced into the autoclave content through a pressure valve, and three mixtures having the following compositions, which were stored separately from each other, were then forced in simultaneously and continuously:

(1.) 191.1 kg vinylidene chloride;
14.7 kg butyl acrylate,
4.2 kg ethyl hexyl acrylate.

(2.) 26.0 kg of a 10% aqueous n-lauryl sulphate,
9.0 kg water;
0.03 kg isoascorbic acid.

(3.) 33.0 kg water,
0.09 kg of 35% $H_2O_2$.

When all of the three mixtures described above had been added, the resulting reaction product was kept in the autoclave for a further 4 hours at 30° C. with stirring and then cooled to room temperature. The resulting dispersion of component A had a solids content of 52% and a density of 1.25.

PREPARATION OF COMPONENT B 95 l of water were introduced into an autoclave equipped with stirrer. 50 g of ammonium persulphate and 50 g of sodium pyrosulphite were dissolved therein. After the addition of 3850 g of methacrylic acid amido-N-methylol ethyl ether and 1650 g of acrylic acid amide, the reaction mixture was adjusted to pH 8.5 with 25% by weight aqueous $NH_4OH$. When the autoclave had been sealed, the contents were maintained at a temperature of 60° C. for 12 hours under a nitrogen atmosphere. After the reaction, the product was cooled to room temperature. In contrast to component A, which was a dispersion, component B obtained from this process was an aqueous solution of a water-clear product. Component B had a solids content of 5.5%. The density could not be defined exactly but a "Ford" outflow time of 17 seconds was measured (this method of measurement is explained after the Examples).

PREPARATION OF THE MIXTURE

The polymer mixture according to the invention was prepared as follows from components A and B which had been prepared separately as described above.

18 kg of component A were diluted with 10 kg of water with stirring and adjusted to pH 6.8 with 90 ml of $NH_4OH$ (25% by weight). 1 kg of the 5.5% aqueous solution of component B was stirred into the resulting component A. To the resulting polymer mixture according to the invention prepared from a dispersed component (A) and a dissolved component (B) there may, if desired, be added a plasticizer and/or lubricant and/or pigment, for example, in an emulsified or similar form.

The subsequent Examples 2 to 7 according to the invention were prepared in the same manner as Example 1 except that the quantitative and qualitative composition of the monomer substances used for component B varied from Example to Example.

A total of four monomer substances were varied in the preparation of component B. These are indicated by the reference numerals 1, 2, 3 and 4 in the following tabulated summary of the Examples.

These references have the following meaning:
1.: Methacrylamido-N-methylolmethylether;
2.: Acrylic acid amide;
3.: N-methylolacrylamide;
4.: Acrylic acid.

In addition, the tabulated summary of Examples contains the analytical data of pH, solids content in % by weight and Ford outflow viscosity for component B.

TABLE 1

Preparation and analytical data of Component B

| Serial No. of the Example according to the invention | Monomers used as starting substances (in % by weight) | | | |
|---|---|---|---|---|
| | Substance 1 | Substance 2 | Substance 3 | Substance 4 |
| 1 | 70 | 30 | — | — |
| 2 | 20 | 80 | — | — |
| 3 | 40 | 60 | — | — |
| 4 | 60 | 40 | — | — |
| 5 | 80 | 20 | — | — |
| 6 | 75 | — | 25 | — |
| 7 | 65 | 30 | — | 5 |

Analytical data of finished Component B

| Example No. | Solids content in % by weight | Ford outflow viscosities in seconds | pH |
|---|---|---|---|
| 1 | 5.5 | 17.1 | 8.7 |
| 2 | 5.2 | 89.2 | 8.7 |
| 3 | 5.1 | 39.2 | 8.7 |
| 4 | 5.1 | 20.2 | 8.4 |
| 5 | 5.2 | 13.0 | 8.8 |
| 6 | 3.8 | 11.8 | 7.0 |
| 7 | 5.7 | 18.1 | 7.5 |

As can be seen from the application tests given later, the polymer mixtures prepared from component B according to the invention were virtually identical in their anchoring strength and transparency under prolonged exposure to high temperatures in spite of the wide variations in this component B while the products available on the market, which are compared with component A according to the invention in the following Table 2, were shown to be substantially inferior in their properties when tested. It must be stated, however, that component A, which is always used in the same qualitative and quantitative composition for preparing the polymer mixture according to the invention, has a substantially more advantageous, because lower, minimum film-forming temperature in °C. than the known products used here for comparison.

TABLE 2

Comparison of properties between component A and some known products

| Example according to the invention | Comparison | Product | Solids content (in %) | Density | pH | Minimum film-forming temperature in degrees Centigrade |
|---|---|---|---|---|---|---|
| 1 | | component A | 52 | 1.25 | 2.2 | 3 |
| 2 | | component A | 52 | 1.25 | 2.2 | 3 |
| 3 | | component A | 52 | 1.25 | 2.2 | 3 |
| 4 | | component A | 52 | 1.25 | 2.2 | 3 |
| 5 | | component A | 52 | 1.25 | 2.2 | 3 |
| 6 | | component A | 52 | 1.25 | 2.2 | 3 |
| 7 | | component A | 52 | 1.25 | 2.2 | 3 |
| | 8 | Diofan 207 D(R) | 45 | — | 1.5–3 | 28 |
| | 9 | Diofan 185 D(R) | 45 | — | 1.5–3 | 18 |
| | 10 | Diofan 3200 X(R) | 45 | — | 1.5–3 | 25 |

The data showing the solids content, density and pH of the finished polymer mixture according to the invention formed from components A and B are summarised in the following Table 3.

The relevant properties of component A and component B is shown again before the values for the component mixture A and B in the same Table. Since the "Ford" outflow viscosity is again used for the data of component B, this method of measuring the viscosity is described below.

A DIN 53211 outflow cup having an outflow nozzle with a lower diameter of 4 mm is used to determine the outflow time viscosity according to Ford. To determine the viscosity of the product (above-mentioned component B), the outflow nozzle is closed and the product at a temperature of 20° C. is introduced into the measuring cup also adjusted to this temperature until the product rises above the internal edge of the cup. The surface of the material to be tested is then covered with a glass plate pushed over it from the side, care being taken to ensure that no air bubbles are trapped between the glass plate and the surface. The outflow cup now contains 100 ml of sample. The lower opening (outflow nozzle) is then released without the contents of the cup flowing out. After the cup has been fixed in the upright position (on a stand), the glass plate is rapidly pulled away so that the sample adhering to it is stripped off at the edge of the cup. The outflow time begins the moment the glass plate is pulled away and ends when the thread of liquid breaks. The outflow time measured in seconds is recorded and the results obtained for the different substances placed side by side. The outflow time in seconds is entered in the following Table.

According to Table 3 the polymer mixture obtained from components A and B is always obtained by mixing 18 parts of component A with 1 part of component B in the manner outlined in the Examples.

TABLE 3

Comparison of properties of component A, component B and the polymer mixture A + B obtained from components A and B.

| | Component A | | |
|---|---|---|---|
| Example No. | Solids content in % | pH | Density |
| 1 | 52 | 2.2 | 1.25 |
| 2 | 52 | 2.2 | 1.25 |
| 3 | 52 | 2.2 | 1.25 |
| 4 | 52 | 2.2 | 1.25 |
| 5 | 52 | 2.2 | 1.25 |
| 6 | 52 | 2.2 | 1.25 |
| 7 | 52 | 2.2 | 1.25 |

Polymer mixture A + B in proportions of 18:1

TABLE 3-continued

Comparison of properties of component A, component B and the polymer mixture A + B obtained from components A and B.

| | Component B | | | A and B parts by weight | | |
|---|---|---|---|---|---|---|
| Example No. | Solids content in % | pH | Ford viscosity | Solids content in % | pH | Density |
| 1 | 5.5 | 8.7 | 17.1 | 34.1 | 6.8 | 1.14 |
| 2 | 5.2 | 8.7 | 89.2 | 33.9 | 6.8 | 1.14 |
| 3 | 5.1 | 8.7 | 39.2 | 33.9 | 6.8 | 1.14 |
| 4 | 5.1 | 8.4 | 20.2 | 33.9 | 6.8 | 1.14 |
| 5 | 5.2 | 8.8 | 13.0 | 33.9 | 6.8 | 1.14 |
| 6 | 3.8 | 7.0 | 11.8 | 33.4 | 6.8 | 1.14 |
| 7 | 5.7 | 7.5 | 18.1 | 34.2 | 6.8 | 1.14 |

To test the properties outlined above, the aqueous polymer mixture according to the invention is then applied to a substrate in the form of a sheet such as a foil in the usual manner and dried and the coated substance is tested to determine the anchoring strength of the coating, the relation of its transparency to temperature, its water-permeability, its other permeabilities and its tendency to adhere to packaged goods.

The methods used to determine these properties, which are summarized in tabular form, will now be briefly described.

As already indicated earlier, in view of the wide spectrum of sheet products of macromolecular substances which could be used as substrates for the polymer mixture according to the invention or for the coating according to the invention produced from it in the form of an aqueous, self-anchoring one-layer coating, the sheet products will be limited to the usual commercial products of the kind disclosed, for example, in German Auslegeschrift No. 1,302,384 or German Auslegeschrift No. 2,539,706, i.e. fibre reinforced tubular casings of fibres impregnated with regenerated cellulose which shrink depending on the external moisture and carry a lacquer containing polyvinylidene halide on their internal surface. The only difference between the tubular casings described in the above mentioned, known Auslegeschriften and those which are to be tested here is that the coatings applied to the internal surface of the tubular casing disclosed in the German Auslegeschriften is also known whereas the coating on the casings to be tested here is the subject matter of the present invention.

The material used in all of the following examples of practical application was a so-called "fibre gut" impregnated with regenerated cellulose and having a calibre of 60 and a weight per unit are of 100/m². The material was coated on its internal surface in the usual manner with the polymer according to the invention which was then dried to form a lacquer.

The different compositions of polymer mixtures shown in the process examples 1 to 7 according to the invention were all applied to the substrate described above and dried and then tested as indicated in the examples of use according to the invention given in the same sequence.

To determine the anchoring strength of the tubular casings coated with the product according to the invention, the sample of casing to be tested, measuring 10×10 cm, was placed in a bath of water which was then heated to boiling (about 99° C.). The sample was removed from the water bath at intervals of 20 minutes and "crushed" between thumb and forefinger, using both hands. If the lacquer is not thereby detached from its substrate, the sample is returned into the boiling water and the test is repeated after a further 20 minutes until, in one of these tests, the coating can first be seen to become detached from its substrate.

The time from the beginning of the boiling test to the first delamination of the product is entered in minutes and compared in the following Table with the products described in comparison Examples 8, 9 and 10 which, instead of being coated with the lacquer according to the invention, are coated with the previously mentioned commercial lacquers, Diofan 207 D, ® Diofan 185 D ® and Diofan 3200 X ®.

The simple, time and cost-saving test for anchoring strength is of particular practical importance for the processing of tubular casings to manufacture sausages which are liable to be subjected to severe stresses in boiling, cooking, gathering and other manipulations.

Another, equally simple test which is also easily carried out is the temperature dependent turbidity test. Samples of the above mentioned size are again placed in a water bath at about 99° C. and are left therein for one hour. The appearance of the lacquer layer is then assessed visually, any clouding due to heat being particularly noted. The practical importance of this turbidity test is that, when the tubular casings mentioned above are subsequently processed into sausages, they are exposed to prolonged boiling temperatures, and the unattractive "white discolouration" which is liable to occur under these conditions should if possible be avoided.

Another important requirement of tubular casings filled with foodstuffs is that they should be as far as possible impermeable to water, so that the goods packaged in them should suffer as little weight loss as possible.

This is tested by the water permeability test carried out by the following method, which is a modification of the test method according to DIN 53 122:

The tubular casings are wetted with water (23° C.) on their lacquered side and exposed on their other side to an atmosphere of 23° C. and 50% relative humidity in air moving at about 2 m per second. The water permeability determined by this test is defined as the quantity of water in g which diffuses per 24 hours through a surface area of one square meter of the tubular casing to be tested at a temperature of 23° C. and a moisture gradient of water to air of 50% relative humidity. The dimension in which the permeability is measured is gram per square meter.

In all the tests in the seven examples, three circular discs, with or without seam but with sealing edge are cut out of each sample of tubular casing with a template and investigated. These circular cuttings are placed with their lacquered surface on the test dish containing 20 ml of an 0.01% Methylene blue solution (according to DIN 53 122). The sealing ring between the circular cutting and the edge of the dish is a silicone rubber ring. An aluminium ring and four clamping screws are used to attach and seal the circular sample firmly to the test dish which is filled with liquid. The dishes are then hung upside down in a frame to ensure that the whole surface to be tested is wetted with liquid. The room in which the test is carried out is air-conditioned at a temperature of 23° C. and at 50% relative humidity.

The sections of tubular casing are weighed after they have adjusted to the atmosphere, i.e. after 16 to 24 hours. Further weighings are carried out at intervals of 24 hours. The measurement is terminated only when three constant results have been obtained in succession. Particular note is taken of water constituents which are discoloured by small quantities of Methylene Blue because they show up the porosity and faults in the lacquer layers. These should be carefully noted because they indicate in what order of magnitude these faults affect the true water-permeability value.

The values of water-permeability in grams per square meter found by the test method described above are entered in the following Table for Examples 1 to 7 according to the invention. The numerical results shown were obtained according to the following calculation:

$$\text{Water permeability in gram per square meter} = \frac{\text{Weighing difference} \times 24 \times 10{,}000}{\text{Weighing interval} \times \text{area of test surface (cm}^2\text{)}}$$

The values for losses in hanging shown in the following Table of test results for practical application were obtained by the hanging loss method of determination which is briefly described below.

A sample of tubular casing 80 cm in length carrying lettering on its surface is briefly washed at one end, placed together with a piece of silicone rubber to form a double fold and sealed down. The sample is soaked in water for about 20 minutes and then stretched in a stretching device at a slight excess pressure of 0.3 bar. The tubular section prepared for the test in this manner is then filled with 1000 cc of water to which some Methylene Blue has been added to give it a faint blue appearance. In cases where hydrochloric acid is split off by foreign products, the water is made slightly alkaline with sodium hydroxide solution in order to prevent discolouration of the Methylene Blue by the acid liberated. When the section of tubular casing has been filled, it is clipped off with silicone rubber and tied above the level of liquid. The sample of casing thus prepared is then boiled at 76° C. for one hour in the usual manner while completely covered. The casing is then cooled in air, when shrinkage casings readily contract. The cooled sample of tubing is then hung in an air-conditioned room at 20° C. and 50% relative humidity for 48 hours to condition it. Any losses during hanging are exactly recorded by hourly weighing of the material during this time, and the hanging loss determined in this manner is recorded in percentage per 24 hours or percentage per 10 days if the test lasted 10 days. The simple calculation is indicated below:

$$\frac{(\text{Initial weight minus final weight}) \times 1000}{\text{Initial weight} \times \text{measuring day}} = \text{percent/24 hours}$$

Instead of using alkaline water containing Methylene Blue as filling for the casing, a casing filled with sausage meat may be subjected to the same hanging loss test. Both types of hanging loss tests are entered in the following Table and the values determined as described above are shown for Examples 1 to 7 according to the invention.

The behaviour shown by a tubular casing coated with a lacquer obtained from dried polymer mixture according to the invention when it is filled with a material which sticks firmly to the wall of the casing is determined by another simple test known as the "peeling test". In this test, a tubular casing filled with sausage meat is cut off at its lower end, near the clip, and the casing is pulled off the meat in the form of a spiral. It is observed empirically whether and to what extent the adherence of the meat to the layer of lacquer on the inside of the casing exceeds the bond between the lacquer and the casing. If the strength of adherence of the contents exceeds the strength of the bond, the lacquer is left on the filling. If not, then the whole casing consisting of supporting layer and lacquer will be stripped off. A so-called "meat turf" varying in extent will be left behind, depending on the nature of the bond and its detachment, i.e. the strength with which the filling adheres to the tubular casing. This test, however, is relevant only in the event of possible delamination between the lacquer and the substrate. The following marks are given empirically:

Grade 1: No lacquer detached even under critical conditions;

Grade 2: Very slight detachment of lacquer at the tearing edge;

Grade 3: Marked detachment of lacquer at the tearing edge;

Grade 4: Partial areas of lacquer detached at the tearing edge;

Grade 5: Large areas of lacquer detached, leaving other parts of lacquer on the substrate;

Grade 6: Lacquer completely separated from the substrate without damage to the lacquer.

The test results described above will now be given in tabular form for Examples 1 to 7 according to the invention and comparison Examples 8 to 10.

TABLE 4

| | Testing of material. | | |
|---|---|---|---|
| Examples (according to the invention 1–7) (Comparison 8–10) | Samples: Fibre gut in g/m² Lacquer application in g/m² | Anchoring strength | Turbity test |
| 1 | 12.8 | not detachable after 420 minutes | very slight cloudiness |
| 2 | 13.4 | not detachable after 420 minutes | very slight cloudiness |
| 3 | 12.9 | not detachable after 420 minutes | very slight cloudiness |
| 4 | 12.8 | not detachable after 420 minutes | very slight cloudiness |
| 5 | 12.6 | not detachable after 420 minutes | very slight cloudiness |
| 6 | 12.6 | not detachable after 420 minutes | very slight cloudiness |
| 7 | 12.8 | not detachable after 420 minutes | very slight cloudiness |
| 8 | 12.8 | detachable after at the most 20 minutes | heavy white (pigment-like) |
| 9 | 12.8 | detachable after at the most 20 minutes | highly opaque to white |
| 10 | 12.8 | detachable after at the most 20 minutes | opaque cloudiness |

| | Hanging losses | | |
|---|---|---|---|
| | Water permeability | Filled with | Filled with sausage | Peeling test (Grade of |

TABLE 4-continued

| Example No. | Testing of material. similar to DIN 53 122 (24 hours) | water (in 10 days) | meat | delamination |
|---|---|---|---|---|
| 1 | 5.8 | 2.5 | 2.0 | 1 |
| 2 | 7.9 | 3.5 | 3.0 | 2 |
| 3 | 7.5 | 3.2 | 2.7 | 1 |
| 4 | 6.6 | 3.0 | 2.6 | 1 |
| 5 | 5.7 | 2.4 | 2.0 | 1 |
| 6 | 5.8 | 2.5 | 2.0 | 1 |
| 7 | 7.5 | 3.2 | 2.7 | 1 |
| 8 | — | — | — | — |
| 9 | — | — | — | — |
| 10 | — | — | — | — |

The examples show the considerable superiority of tubular casings equipped with the lacquer coats according to the invention compared with similar commercial products. In particular, the so-called white discolouration which is due to temperature and has been found very troublesome for many years, is virtually completely suppressed by using the lacquer substances according to the invention without these substances adversely affecting any other parameters of practical application. Since the test methods used are for the most part very simple, virtually any manufacturer can very rapidly get a clear picture of the properties of the casings equipped with the lacquer coatings according to the invention.

The structural unit of bonding agent in the form of unsaturated carbonamide-N-methylol derivatives used according to the invention are only claimed here as known units in polymer mixtures according to the invention. The method of preparation of these bonding units and their other uses have been disclosed, for example, in German Auslegeschrift No. 1,002,326 and German Pat. Nos. 1,122,037; 1,182,769; 1,221,018 and 1,228,064 and in secondary literature, e.g. H. Rauch-Puntigam and Ta. Völker: Acryl- und Methacrylverbindungen, Springer-Verlag, Berlin 1967.

We claim:

1. An aqueous polymer mixture of at least two components containing a vinylidene halide copolymer for the preparation of heat-sealing one layer coatings comprising I component A which containins the vinylidene halide compolymer and is present in the form of an acid aqueous dispersion and consists of micronuclear shell structures comprising a copolymer which forms the nuclear portion which copolymer consists of recurrent structural units derived from a monomer mixture of 10 to 57% by weight of methyl acrylate and/or 5 to 30% by weight of ethyl acrylate and/or 1 to 5% by weight of acrylic acid and/or 15 to 30% by weight of methacrylic acid-n-butyl ester and/or 15 to 30% by weight of methyl methacrylate and the amount of vinylidene halide necessary to make up the percentage by weight to 100, and a copolymer forming the shell portion, consisting of recurrent structural units derived from a monomer mixture of 1 to 14% by weight of methyl acrylate and/or 1 to 14% by weight of methyl methacrylate and/or 1 to 14% by weight of ethyl methacrylate and/or 1 to 14% by weight of ethyl hexyl acrylate and/or 1 to 14% by weight of acrylic acid-n-butyl ester and/or 1 to 14% by weight of methacrylic acid-n-butyl ester and 0.1 to 5% by weight of itaconic acid and the quantity of vinylidene halide required to make up this monomer mixture to 100% by weight but not amounting to more than 95% by weight thereof based on 100% of the total monomer mixture and II of a component B, which is a polymeric anchoring substance containing functional groups and which is added in form of an alkaline aqueous solution and consists of homopolymers and/or copolymers derived from unsaturated carboxylic acid amid-N-methylol derivatives corresponding to the general formula

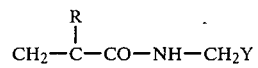

in which
R represents —H or —CH$_3$
and Y represents

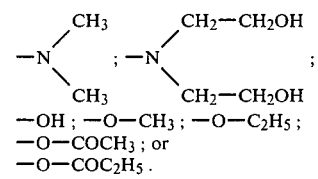
—OH ; —O—CH$_3$ ; —O—C$_2$H$_5$ ;
—O—COCH$_3$ ; or
—O—COC$_2$H$_5$ .

2. An aqueous polymer mixture as claimed in claim 1 wherein component B contains in addition units derived from unsaturated water-soluble carboxylic acids and/or the amide of these unsaturated carboxylic acids and/or methacrylic acid amide.

3. An aqueous polymer mixture as claimed in claim 1 which also contains components C in the form of plasticizers and/or components D in the form of lubricants and/or components E in the form of pigments.

4. An aqueous polymer mixture as claimed in claim 1 in which the vinylidene halide is vinylidene chloride.

5. An aqueous polymer mixture as claimed in claim 1 in which the carboxylic acid amide-N-methylol derivative is methacrylic acid amido-N-methylol methyl ether.

6. An aqueous polymer mixture as claimed in claim 1 in which in addition to methacrylic acid amido-N-methylolmethyl ether, component B contains recurrent structural unit derived from an acrylic acid amide and optionally acrylic acid.

7. An aqueous polymer mixture as claimed in claim 6 in which the recurrent structural unit, acrylic acid amide, in component B is replaced by the recurrent structural unit, N-methylolacrylamide.

8. An aqueous polymer mixture as claimed in claim 6 in which in component B, the recurrent structural units derived from methacrylic acid amido-N-methylomethyl ether, are present in a quantity of 20 to 80% by weight from acrylic acid amide in a quantity of 20 to 80% by weight and optionally from N-methylolacrylamide, in a quantity of 20 to 30% by weight and from acrylic acid in a quantity of 3 to 8% by weight.

9. A process for the preparation of a polymer mixture as claimed in claim 1 in which in order to produce component A, a nuclear dispersion (substance I) is first produced by known aqueous emulsion polymerisation techniques, by the copolymerisation of 10 to 57% by weight methyl acrylate and/or 5 to 30% by weight of ethyl acrylate and/or 1 to 5% by weight of acrylic acid and/or 15 to 30% by weight of methacrylic acid-n- butyl-ester and/or 15 to 30% by weight of methyl methacrylate and the quantity of vinylidene halide required to make the percentage by weight up to 100, using soidum vinyl sulphonate and a conventional emulsifier in the presence of a redox catalyst, and on this resulting nuclear polymer substance (substance I) which is in the form of an aqueous dispersion there is then polymerised an aqueous dispersion of a shell building substance which has been formed from three separately prepared substances (II, III, and IV), this latter polymerisation being carried out by adding, to the the already polymerised, dispersed nuclear substances I to which has previously been added an aqueous solution of itaconic acid and a similar solution of a conventional redox catalyst, the aforesaid substance II in the form of a monomeric mixture of vinylidene halide, butyl acrylate and ethyl hexyl acrylate, and, separately therefrom, the aforesaid substance III in the form of a mixture of a commercial emulsifier and the reducing part of a conventional redox catalyst and, separately therefrom, the aforesaid substance IV in the form of the oxidizing part of a conventional redox catalyst, which oxidizing part has been taken up in water, and then producing the shell structure polymer on this nuclear substance by a conventional emulsion polymerisation technique to form the aqueous dispersion of component A, to which is added the water-soluble component B which has been prepared separately by (co)polymerisation from an unsaturated carboxylic acid amide-N-methylol derivative corresponding to the general formula

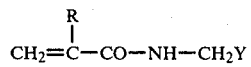

in which
R represents —H or —CH$_3$ and
Y represents

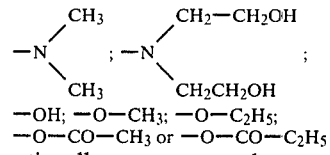

—OH; —O—CH$_3$; —O—C$_2$H$_5$;
—O—CO—CH$_3$ or —O—CO—C$_2$H$_5$ and optionally an unsaturated water soluble carboxylic acid and/or the amide of this carboxylic acid and/or methacrylic acid amide, using conventional techniques with the addition of a redox initiator, and the finished, aqueous polymer mixture is thus formed, optionally with the addition of further components in the form of known plasticizers C and/or lubricants D and/for pigments F.

10. A process as claimed in claim 9 in which components A is prepared in an aqueous acidic medium and is stable when stored in such a medium.

11. A process as claimed in claim 9 in which component B is prepared in an aqueous alkaline medium and is stable when stored in such a medium.

12. A process as claimed in claim 9 in which the mixture of components A and B is prepared in a weakly acid to neutral medium and is stable when stored in such a medium.

13. A process as claimed in claim 9 in which the stabilizer used for the polymer mixture of A+B is a weakly acid to neutral medium adjusted to a pH of 5.5 to 7.

14. A polymer mixture when prepared by a process as claimed in claim 9.